US012399444B2

(12) United States Patent
Mima et al.

(10) Patent No.: US 12,399,444 B2
(45) Date of Patent: Aug. 26, 2025

(54) SUPPORT UNIT, TRANSFER DEVICE, AND IMAGE FORMING APPARATUS

(71) Applicants: Ryotaro Mima, Kanagawa (JP); Tomoaki Suga, Kanagawa (JP)

(72) Inventors: Ryotaro Mima, Kanagawa (JP); Tomoaki Suga, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/659,327

(22) Filed: May 9, 2024

(65) Prior Publication Data

US 2024/0393709 A1 Nov. 28, 2024

(30) Foreign Application Priority Data

May 22, 2023 (JP) ................................ 2023-084195

(51) Int. Cl.
*G03G 15/20* (2006.01)
*G03G 15/01* (2006.01)
*G03G 15/16* (2006.01)

(52) U.S. Cl.
CPC ..... *G03G 15/0131* (2013.01); *G03G 15/0189* (2013.01); *G03G 15/1605* (2013.01)

(58) Field of Classification Search
CPC ........... G03G 15/0131; G03G 15/0189; G03G 15/1605; G03G 15/161; G03G 15/1615; G03G 21/168
USPC ......................................... 399/297, 302, 308
See application file for complete search history.

(56) References Cited

U.S. PATENT DOCUMENTS 10,386,781 B2 * 8/2019 Shima .................. G03G 15/161
11,543,762 B2 * 1/2023 Taniguchi ............ G03G 21/168
2016/0313693 A1 10/2016 Fujiya et al.
2020/0064765 A1 2/2020 Suga et al.
2020/0133172 A1 4/2020 Konishi et al.
2020/0379377 A1 * 12/2020 Hayakawa ......... G03G 15/1615
2023/0113719 A1 4/2023 Suga
2024/0053695 A1 2/2024 Takagi et al.

FOREIGN PATENT DOCUMENTS

JP 2018031999 A 3/2018

OTHER PUBLICATIONS

U.S. Appl. No. 18/232,354, filed Aug. 10, 2023.
U.S. Appl. No. 18/235,887, filed Aug. 21, 2023.

* cited by examiner

*Primary Examiner* — Hoan H Tran
(74) *Attorney, Agent, or Firm* — Harness, Dickey & Pierce, P.L.C.

(57) ABSTRACT

A support unit includes: a first support to support and position one end of a first shaft of a pressure unit, including a pressure rotator to apply pressure to an object, in each of: an assembly direction in which the pressure unit is assembled to the support unit; and an orthogonal direction orthogonal to each of the assembly direction and an axial direction of the first shaft; a second support having a groove supporting another end of the first shaft; and a third support supporting a second shaft of the pressure rotator. The first support, the second support, and the third support the pressure unit rotatable around the first shaft. The groove of the second support has an arc shape having a center on an axial center of the second shaft; and an opening at an entrance of the groove in the assembly direction.

14 Claims, 10 Drawing Sheets

SUPPORT UNIT, TRANSFER DEVICE, AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2023-084195, filed on May 22, 2023, in the Japan Patent Office, the entire disclosure of which is hereby incorporated by reference herein.

BACKGROUND

Technical Field

Embodiments of the present disclosure relate to a support unit, a transfer device, and an image forming apparatus.

Related Art

A support unit is known that allows a pressure unit to rotate freely around the reference shaft as a pivot point. The support unit includes a first support, a second support, and a third support. The first support supports one end of the reference shaft used for positioning the pressure unit that presses a pressed member via a pressing member. The second support supports the other end of the reference shaft. The third support supports the shaft of the pressing member.

A typical support unit rotatably supports a secondary transfer unit serving as a pressure unit.

However, the pressure unit may twist when the pressing member applies pressure to the pressed member.

SUMMARY

An embodiment of the present disclosure provides a support unit including: a first support to support and position one end of a first shaft of a pressure unit, including a pressure rotator to apply pressure to an object, in each of: an assembly direction in which the pressure unit is assembled to the support unit; and an orthogonal direction orthogonal to each of the assembly direction and an axial direction of the first shaft; a second support having a groove supporting another end of the first shaft; and a third support supporting a second shaft of the pressure rotator. The first support, the second support, and the third support the pressure unit rotatable around the first shaft. The groove of the second support has an arc shape having a center on an axial center of the second shaft; and an opening at an entrance of the groove in the assembly direction.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 4A-1, 4A-2, 4B-1, and 4B-2 are diagrams illustrating how the secondary transfer unit in FIGS. 2A, 2B, and 2C that is twisted under normal conditions is attached to a drawer housing;

FIGS. 5A-1, 5A-2, 5B-1, and 5B-2 are diagrams illustrating how a secondary transfer roller of a secondary transfer unit that is twisted under normal conditions contacts an intermediate transfer belt;

FIGS. 6A-1, 6A-2, 6B-1, and 6B-2 are diagrams each illustrating how a secondary transfer roller contacts an intermediate transfer belt when the secondary transfer unit is twisted under normal conditions and a rear portion of the secondary transfer roller is positioned higher than a front portion of the secondary transfer roller, according to an embodiment of the present disclosure;

Figure 1:
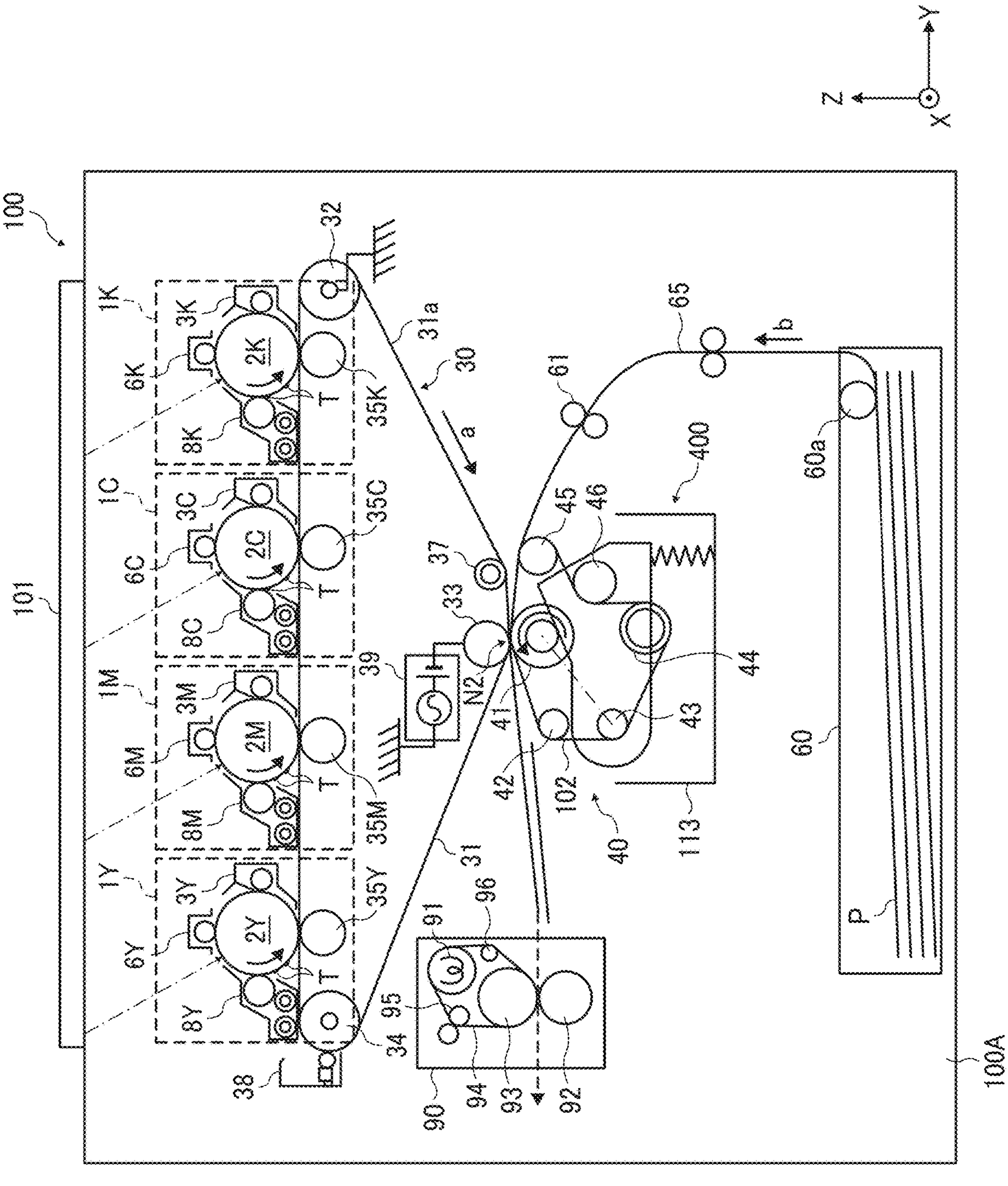
FIG. 1 is a schematic diagram of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

According to one aspect of the present disclosure, the occurrence of twisting in the pressure unit is reduced, and the pressure unit can be easily assembled to the support unit. The following describes a developing device, a process cartridge, and an image forming apparatus, according to an embodiment of the present disclosure, with reference to the accompanying drawings. It is to be understood that those skilled in the art can easily modify and change the present disclosure within the scope of the appended claims to form other embodiments, and these modifications and changes are included in the scope of the appended claims. The following describes an illustrative embodiment and does not limit the present disclosure.

With reference to drawings, the following describes an embodiment of the present disclosure. FIG. 1 is a schematic view of a configuration of an image forming apparatus, or a printer 100. In the present embodiment, the image forming apparatus is an electrophotographic color printer. The printer 100 is provided with four image forming units 1Y, 1M, 1C, and 1K that form toner images of yellow (Y), magenta (M), cyan (C), and black (K), respectively. The printer 100 is also provided with, for example, a transfer unit 30 as an intermediate transfer device, a secondary transfer unit 40, a cassette 60 that stores a recording material P as a to-be-conveyed object, and a fixing device 90.

The four image forming units 1Y, 1M, 1C, and 1K form an image forming section and use toners of Y, M, C, and K that are different color toners as powder developers. The image forming units 1Y, 1M, 1C, and 1K have a similar structure except the color of toner. The image forming units 1Y, 1M, 1C, and 1K include drum-shaped photoconductors 2Y, 2M, 2C, and 2K serving as image bearers, photoconductor cleaners 3Y, 3M, 3C, and 3K, dischargers, charging devices 6Y, 6M, 6C, and 6K, developing devices 8Y, 8M, 8C, and 8K, respectively.

The photoconductors 2Y, 2M, 2C, and 2K have surfaces that are evenly charged by the charging devices 6Y, 6M, 6C, and 6K. Subsequently, the surfaces of the photoconductors 2Y, 2M, 2C, and 2K are optically scanned by exposure light such as the laser beams emitted from a plurality of optical writing units 101 disposed above the image forming units 1Y, 1M, 1C, and 1K. As a result, multicolor electrostatic latent images are formed. The developing devices 8Y, 8M, 8C, and 8K develop the electrostatic latent images on the photoconductors 2Y, 2M, 2C, and 2K with yellow, magenta, cyan, and black toners, into visible toner images T, respectively. Thus, the toner images T are formed on the photoconductors 2Y, 2M, 2C, and 2K. The toner images T on the photoconductors 2Y, 2M, 2C, and 2K are primarily transferred and borne onto the front surface of the intermediate transfer belt 31 composed of an endless belt.

The intermediate transfer unit 30 as an intermediate transfer device is disposed below the image forming units 1Y, 1M, 1C, and 1K. The intermediate transfer unit 30 stretches and rotates the intermediate transfer belt 31 in the clockwise direction in FIG. 1. In the present embodiment, a direction of rotation of the intermediate transfer belt 31 is referred to as a "belt travel direction a" indicated by an arrow a in FIG. 1.

In addition to the intermediate transfer belt 31, the transfer unit 30 includes a drive roller 32, a secondary-transfer backside roller 33, a cleaning backup roller 34, four primary transfer rollers 35Y, 35M, 35C, and 35K, and a pre-transfer roller 37. The intermediate transfer belt 31 is looped around and stretched taut between the drive roller 32, the secondary-transfer backside roller 33, the cleaning backup roller 34, the four primary transfer rollers 35Y, 35M, 35C, and 35K, and the pre-transfer rollers 37. As a driver such as a drive motor drives and rotates the drive roller 32 clockwise, the intermediate transfer belt 31 rotates clockwise.

A secondary transfer unit 40 as a pressure unit that includes a secondary transfer belt 102 is arranged outside and below the loop of the intermediate transfer belt 31. The secondary transfer belt 102 according to the present embodiment serves as a belt member or a transfer belt. The secondary transfer belt 102 is looped around multiple tension rollers including the secondary transfer roller 41 as a pressure member or pressure rotator.

A cassette 60 that serves as a container and stores a plurality of recording materials P in a stacked state is arranged below the secondary transfer unit 40. In the cassette 60, a roller 60*a* contacts an uppermost recording material P of the bundle of recording media and rotates at a predetermined timing to feed the recording material P from the cassette 60 to a conveyance path 65 toward a secondary transfer nip N2. The recording material P that is fed and sent to the conveyance path 65 is then sent by a registration roller pair 61 to the secondary transfer nip N2 at a synchronized timing in the secondary transfer nip N2 with the toner image on the front surface of the intermediate transfer belt 31.

In the secondary transfer nip N2, the toner image on the outer circumferential surface of the intermediate transfer belt 31 is collectively transferred onto the recording material P by a secondary transfer electric field and a nip pressure applied thereto, thereby forming a full-color toner image in combination with white color of the recording material P.

The fixing device 90 is disposed downstream from the secondary transfer nip N2 in a conveyance direction b of the recording medium P. The fixing device 90 includes a heating roller 91 as a heating rotator, a fixing roller 93, a support roller 96, and a tension roller 95 serving as a tensioner that are support rollers for the fixing belt 94.

The fixing device 90 also includes a pressure roller 92 as a pressing rotator that contacts the fixing roller 93. The fixing belt 94 is sandwiched by the pressure roller 92 and the fixing roller 93. The recording material P to which the toner image has been transferred is fed to the fixing device 90. The recording material P is nipped at a fixing nip at which the fixing roller 93 and the pressure roller 92 are in contact with each other via the fixing belt 94. In the fixing device 90, the heating roller 91 includes a heat source therein. Heat of the heat source transfers from the heating roller 91 to the recording material P via the fixing belt 94 and softens toner in the full-color toner image at the fixing nip. The heat and pressure in the fixing nip fixes the full-color toner image onto the recording material P. After the toner image is fixed on the recording material P, the recording material P is ejected from the fixing device 90, outside the printer 100.

As illustrated in FIG. 1, the secondary transfer device 400 according to the present embodiment has the secondary transfer unit 40 as a belt unit or a pressure unit, and a drawer housing 113 as a support unit to support the secondary transfer unit 40 in a rotatable manner.

The secondary transfer unit 40 according to the present embodiment is provided with five tension rollers that support the secondary transfer belt 102 on its inner surface. More specifically, the five tension rollers include the secondary transfer roller 41, a separation roller 42, a driven roller 43, a drive roller 44, and an imbalance correction roller 45. also includes a tension roller 46 that presses the secondary transfer belt 102 from its outer circumferential surface. The secondary transfer unit 40 is supported by the drawer housing 113. The drawer housing 113 is a unit support housing that can be pulled out toward the front of the device body, or in the X-direction. FIG. 1 is a schematic front view of the printer 100, and the X-direction, the Y-direction, and the Z-direction illustrated in FIG. 1 are defined as follows. The X-direction is one of the front-to-back direction of the printer 100, specifically toward the front. The Y-direction corresponds to the left-to-right direction of the printer 100, specifically toward the right. The Z-direction is the vertical direction, which is the direction (or the direction of assembly) in which the drawer housing 113 of the secondary transfer unit is assembled.

Figure 2A:
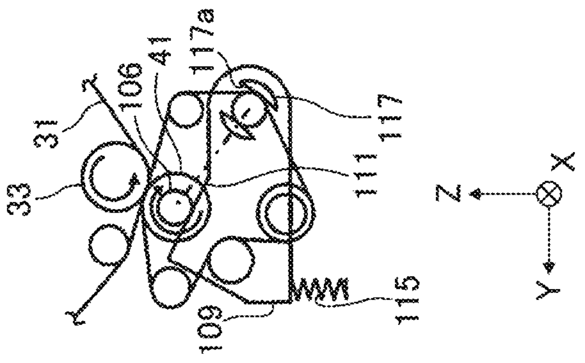
FIGS. 2A, 2B, and 2C are diagrams each illustrating a configuration of a secondary transfer device.
Figure 2B:
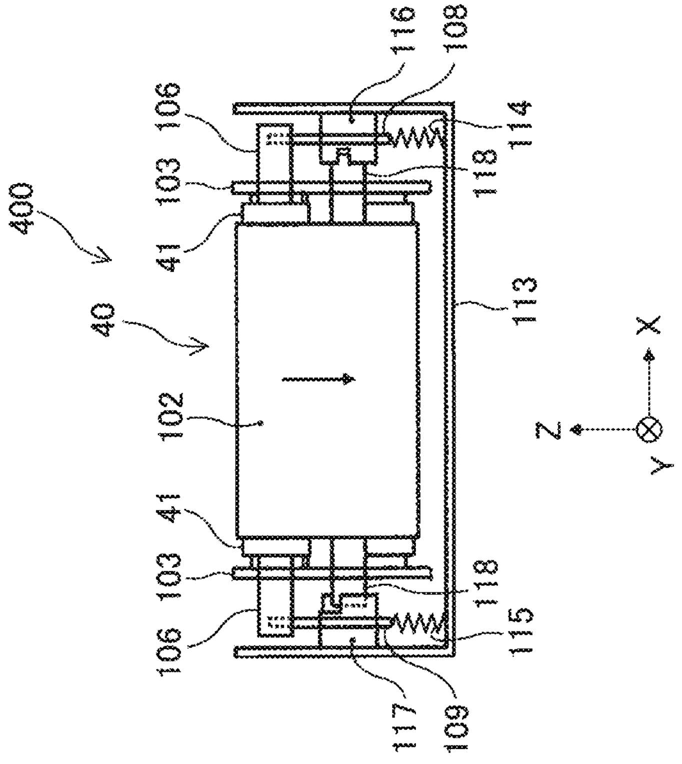
Figure 2C:
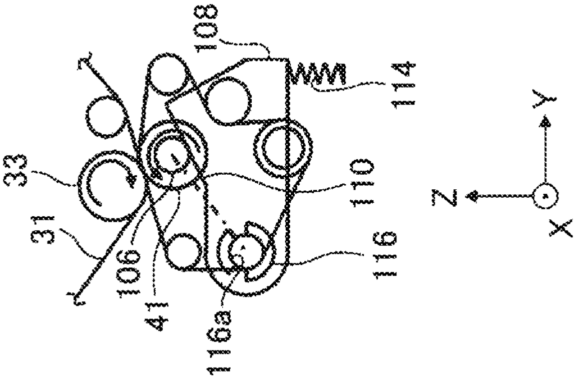
Figures 1, 4A:
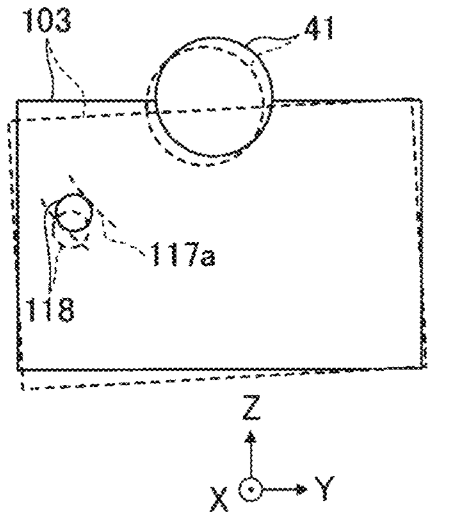
Figures 1, 4B:
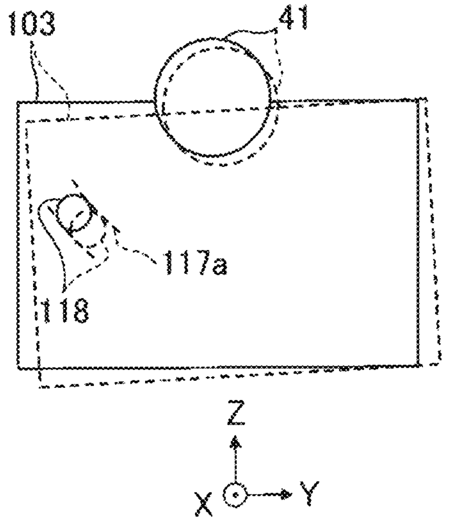
Figures 2, 4A:
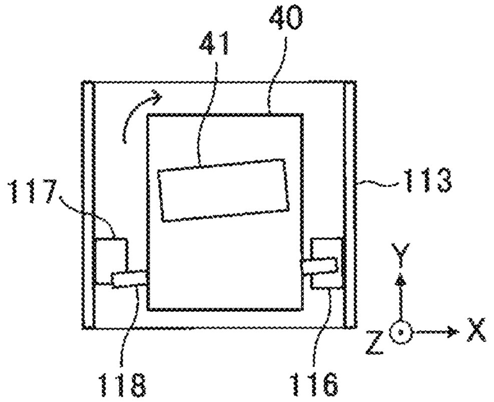
Figures 2, 4B:
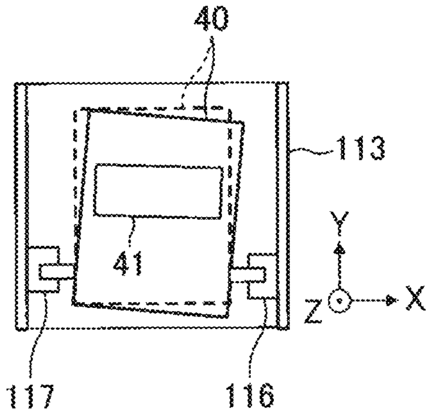

FIG. 2 is a schematic diagram illustrating a configuration of the secondary transfer device 400. The X-direction, Y-direction, and Z-direction in FIGS. 2A, 2B, and 2C are the same as in FIG. 1. FIG. 2B is a side view of the secondary transfer unit 40 in a direction from the left of the printer. FIG. 2A is a rear view of the secondary transfer unit 40, taken from the rear side of the printer. FIG. 2C is a front view of the secondary transfer unit 40, taken from the front side of the printer.

The secondary transfer unit 40 according to the present embodiment includes a pair of roller support plates 103 as a roller support that supports multiple tension rollers around which the secondary transfer belt 102 is looped. The secondary transfer unit 40 is supported by the drawer housing 113. The drawer housing 113 is a support unit that can be pulled out in the X-direction of the device body.

The secondary transfer roller 41 according to the present embodiment, which forms the secondary transfer nip N2 (see FIG. 1) with the intermediate transfer belt 31, freely rotates around a secondary transfer roller shaft 106, which is a fixed shaft. The secondary transfer roller shaft 106 is supported by contact surfaces 110 and 111 as a third support of rotary arms 108 and 109 (or a pressing body or pressing bodies), and is pressed against the intermediate transfer belt 31 by pressing forces from the rotary arms 108 and 109. The contact surfaces 110 and 111 are substantially perpendicular to a vector connecting the centers of the secondary transfer roller 41 and the secondary-transfer backside roller 33 opposed to the secondary transfer roller 41 with the intermediate transfer belt 31 interposed therebetween. The contact surfaces 110 and 111 serve as sub-reference planes for positioning the secondary transfer unit 40.

The rotary arms 108 and 109 are supported by rotary shafts 116 and 117, which are support portions integral with the drawer housing 113, so as to be rotatable about the center shaft. Springs 114 and 115 between the rotary arms 108 and 109 and the drawer housing 113 rotationally urge the rotary arms 108 and 109. The rotary arms 108 and 109 press the secondary transfer unit 40 against the intermediate transfer belt 31 via the contact surfaces 110 and 111.

The rotary shaft 116 as a first support on the front side of the secondary transfer unit 40 has a hole 116*a* that supports the front end of a shaft 118 as a reference shaft in the X-direction. The shaft 118 serves as a primary reference for positioning the secondary transfer unit 40. The front portion of the rotary shaft 116, which is one end in the axial direction, supports the shaft 118 and the front portion of the rotary arm 108 such that the rotation center of the shaft 118 matches the rotation center of the front portion of the rotary arm 108. The rotary shaft 116 on the front side swingably supports the front end portion of the shaft 118 of the secondary transfer unit 40. The shaft 118 of the secondary transfer unit 40 is an irrotational axis whose both ends are supported by the pair of roller support plates 103, and rotatably supports the driven roller 43 illustrated in FIG. 1 between the pair of roller support plates 103.

The rotary shaft 117 as a second support has a groove 117*a* that engages and supports the rear end portion of the shaft 118 of the secondary transfer unit 40. A pair of side surfaces of the groove 117*a* are shaped in a radius (R) that is concentric with the center of the secondary transfer roller 41. The groove 117*a* is shaped as an arc, centered on the axis of the secondary transfer roller 41. The rear end portion of the shaft 118 is supported in the groove 117*a*, allowing the shaft 118 to move in a manner concentric with the center of the secondary transfer roller 41.

The secondary transfer unit 40 is supported by the drawer housing 113 via the rotary shafts 116 and 117 and the contact surfaces 110 and 111 of the rotary arms 108 and 109. The secondary transfer unit 40 is detachably attachable to the drawer housing 113 in the Z-direction or the vertical direction. As the drawer housing 113 is drawn from the body of the image forming apparatus, the secondary transfer unit 40 can be detachably attached to the drawer housing 113 in the Z-direction.

The rotary arm 108 on the front side and the rotary arm 109 on the rear side are rotationally driven by separate pressure drive devices, and the pressure of the rotary arms 108 and 109 to the secondary transfer unit 40 can be adjusted by the respective pressure drive devices.

In the present embodiment, various types of recording materials P may be used such as plain paper, thick paper, a postcard, an envelope, thin paper, coated paper, art paper, tracing paper, and a transparency for overhead projector (OHP). The optimum secondary-transfer pressure or the optimum pressure at the transfer nip varies depending on the type of the recording material P. In order to handle such a situation, in the present embodiment, the secondary-transfer pressure is adjusted depending on the type of the recording material P. For example, information about a type of the recording material P placed in the cassette 60 is input by a user operating an operation panel included in the printer body. The controller of the printer sets the drive time of the pressure motors in the respective pressure drive devices based on the input information about the type of recording materials P. When the pressure motors are stepping motors, the controller sets the number of steps based on the input information about the type of recording material P.

As the pressure motors drives for the set drive time or the set number of steps, the pressing force applied from the rotary arms 108 and 109 to the secondary transfer roller shaft 106 is adjusted according to the type of sheet or the recording material P. Due to such a configuration, the pressing force that is applied to the secondary transfer nip N2 is adjusted to the pressing force suitable for the type of sheet to achieve secondary-transfer pressure suitable for the type of sheet.

In the present embodiment, the following advantages are obtained by rotatably attaching the rotary arms 108 and 109 to the rotary shafts 116 and 117, respectively, which supports the secondary transfer unit 40. In other words, the rotation center of the secondary transfer unit and the rotation center of the rotary arm can be substantially aligned with each other, and the change in the contact position of the rotary arm with the secondary transfer roller shaft 106 can be reduced by adjusting the pressing force.

This minimizes the disturbance in the relation between the pressing force and the rotational position of the rotary arm, thus facilitating the adjustment of the pressing force.

In particular, the front side of the shaft 118 is inserted into the hole 116*a* centered on the axis of the rotary shaft 116. This positions the secondary transfer unit 40 in the Z-direction and the Y-direction. The rotation center of the secondary transfer unit 40 and the rotation center of the rotary arm 108 coincide with each other. This minimizes, for the front side, the disturbance in the relation between the pressing force and the rotational position of the rotary arm, thus facilitating the adjustment of the pressing force.

In this embodiment, the front end portion (one end in the axial direction) of the shaft 118 of the secondary transfer unit 40 is swingably supported, and the rear end portion (the other end) of the shaft 118 of the secondary transfer unit 40 is inserted into the groove 117*a* and is supported movably concentrically with the center of the secondary transfer roller 41. Thus, the secondary transfer unit 40 is supported by the drawer housing 113 without its orientation in the Y-direction being restricted. As a result, the secondary transfer unit 40 can be supported in a position inclined in the Z-direction with respect to the X-direction within the apparatus.

The secondary transfer unit 40 may be twisted when it is in the standalone belt unit state (referred to as "natural condition") before installation into the unit support housing, due to manufacturing errors or similar factors. In this case, the orientation of the roller support plate 103 on the front side in the X-direction differs from the orientation of the roller support plate 103 on the rear side in the X-direction. As a result, the multiple rollers around which the secondary transfer belt 102 supported by the roller support plate 103 is looped are inclined with respect to the X-direction, and the secondary transfer belt 102 may be skewed to one side in the X-direction while the secondary transfer belt 102 is rotating. Such a skew of the belt to one side may be referred to as belt imbalance in the following description.

In view of this, in the present embodiment, the inclination of one of the rollers over which the secondary transfer belt 102 is stretched with respect to the X-direction can be adjusted. Adjusting the inclination of the roller with respect to the X-direction reduces the imbalance, or skew of the secondary transfer belt 102 due to the twist of the secondary transfer unit 40 under normal conditions.

Figure 3:
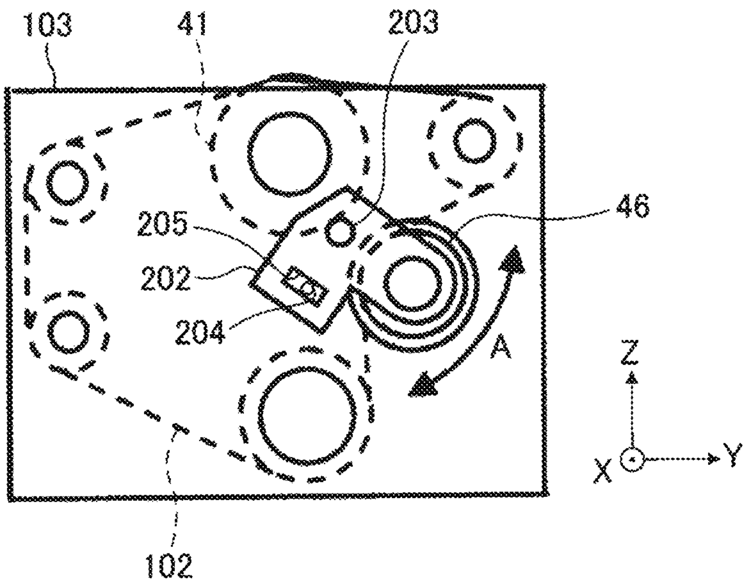
FIG. 3 is a diagram illustrating inclination adjustment.

FIG. 3 is a diagram illustrating the inclination adjustment.

In the present embodiment, the tension roller 46 is capable of inclination adjustment. The front portion of the tension roller 46 is supported by a front portion of the roller support plate 103 through an inclination adjuster 202. A roller other than the tension roller 46 may be a roller whose inclination can be adjusted.

The inclination adjuster 202 is rotatably supported by the pin 203 that is arranged on the front portion of the roller support plate 103. The inclination adjuster 202 according to the present embodiment is provided with a round screw insertion slot 205 around the pin 203, i.e., the rotation center of the inclination adjuster 202.

As the inclination adjuster 202 is driven to rotate around the pin 203, the front side of the tension roller 46 moves in the direction of the arrow A in the drawing, and the inclination of the tension roller 46 with respect to the X-direction (axial direction) is adjusted. For example, when the secondary transfer belt 102 is skewed to the rear side due to the torsion of the secondary transfer unit 40 under normal conditions, the inclination is adjusted as follows. The inclination of the tension roller 46 with respect to the X-direction is adjusted at the portion where the secondary transfer belt 102 is looped over the tension roller 46 such that the secondary transfer belt 102 is skewed to the front side. After the inclination adjustment is complete, the inclination adjuster 202 is fastened to a front portion of the roller support plate 103 using a screw 204. Due to such a configuration, the belt imbalance or skew of the secondary transfer belt 102 due to the twist of the secondary transfer unit 40 under normal conditions is reduced.

When the rotary shafts 116 and 117 support the shaft 118 in a manner that the shaft 118 remains fixed (or cannot move) within the YZ plane, and the secondary transfer unit 40 is mounted in the drawer housing 113 without restricting its orientation around the X-axis, the following troubles may arise. In other words, when the secondary transfer unit 40 twisted under natural conditions is brought into contact with the intermediate transfer belt 31 through the secondary transfer belt 102 by the rotary arms 108 and 109, twisting occurs in the secondary transfer roller 41. As a result, the optimum inclination relationship among the rollers, which is maintained by the inclination adjuster 202 to prevent excessive belt skew, is disrupted, leading to an increased skew of the secondary transfer belt 102. As a result, the speed of the skew of the secondary transfer belt 102 exceeds acceptable limits, causing the guides at both ends of the secondary transfer belt 102 to strongly collide with the restricting member of the imbalance correction roller 45. This frequent contact can lead to premature wear and potentially damage the secondary transfer belt 102.

However, in the present embodiment, with the shaft 118 supported and the secondary transfer unit 40 attached to the drawer housing 113, the orientation of the secondary transfer unit 40 around the Y-direction is maintained without restriction. In other words, the front end portion of the shaft 118 is pivotally supported by the rotary shaft 116 on the front side, and the rear end portion of the shaft 118 is supported by the rotary shaft 117 on the rear side in such a manner that the shaft 118 can move around the secondary transfer roller shaft. This configuration allows the secondary transfer unit 40 to be supported without any restriction on its orientation around the Y-axis. With such a configuration, the secondary transfer unit 40 that is inclined in the Z-direction with respect to the X-direction can be supported by the drawer housing 113. Thus, by using the rotary arms 108 and 109, the twisting of the secondary transfer roller 41 when the secondary transfer roller 41 contacts the intermediate transfer belt 31 is reduced, which helps reduce the skew of the secondary transfer belt 31. This also prevents the skew from worsening and keeps the speed of the skew within acceptable limits. This is described below with reference to the drawings.

FIGS. 4A-1, 4A-2, 4B-1, and 4B-2 are diagrams illustrating how the secondary transfer unit 40 that is twisted under normal conditions is attached to the drawer housing 113.

In FIGS. 4A-1, 4A-2, 4B-1, and 4B-2, the solid lines indicate the front side, and the broken lines indicates the rear side.

For example, as illustrated in FIGS. 5A-1, 5A-2, 5B-1, and 5B-2, the twisting of the secondary transfer unit 40 causes a misalignment between the front portion and the rear portion of the shaft 118. As it stands, with the front portion of the shaft 118 supported by the rotary shaft 116, the rear portion of the shaft 118 cannot be inserted into the groove 117*a* of the rotary shaft 117.

In the present embodiment, by swingably supporting the front portion of the shaft 118 with respect to the rotary shaft 116, as illustrated in FIG. 4B-1, the secondary transfer unit 40 can be attached to the drawer housing 113 while being inclined in the Y-direction with respect to the X-direction. By inclining the secondary transfer unit 40 in the Y-direction relative to the X-direction, the rear portion of the shaft 118 can be inserted into the groove 117*a* of the rotary shaft 117, allowing the twisted secondary transfer unit 40 to be supported by the drawer housing 113.

FIGS. 5A-1, 5A-2, 5B-1, and 5B-2 are diagrams illustrating how the secondary transfer roller 41 of the secondary transfer unit 40 that is twisted under normal conditions contacts the intermediate transfer belt 31.

Figures 1, 5A:
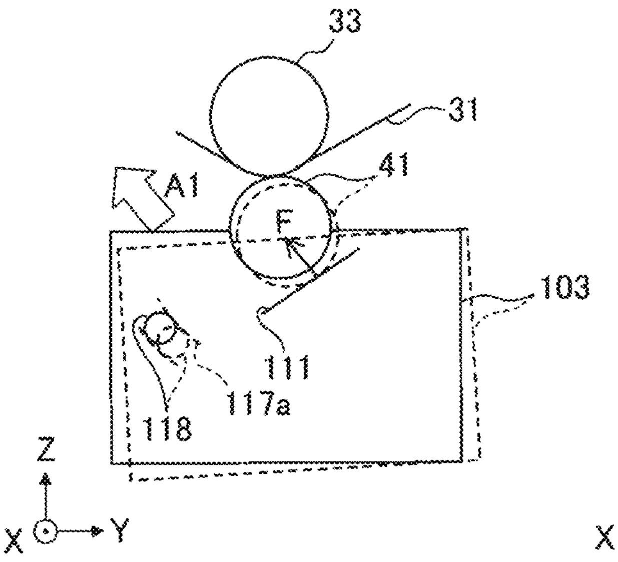

As illustrated in FIGS. 5A-1 and 5A-2, due to the twist of the secondary transfer unit 40, the rear portion of the secondary transfer roller 41 indicated by the broken line in the drawing may be positioned lower than its front portion indicated by the solid line in the drawing. In such cases, the front portion of the secondary transfer roller 41 contacts the intermediate transfer belt 31 earlier than the rear portion of the secondary transfer roller 41.

As described above, according to the present embodiment, the rotary arm 108 on the front side and the rotary arm 109 on the rear side are driven to rotate independently by different pressure drivers. In this configuration, when the front portion of the secondary transfer roller 41 contacts the intermediate transfer belt 31, the front portion of the rotary arm 108 stops rotating, and only the rear portion of the rotary arm 109 continues rotating.

In view of these circumstances, when the orientation of the secondary transfer unit 40 in the Y-direction is restricted and the secondary transfer unit 40 is supported by the drawer housing 113, the rear portion of the secondary transfer roller 41 rotates on the shaft 118 in the X-direction. As a result, the twisting of the secondary transfer unit 40 changes, the relationship between the inclinations of the rollers gets worse, the belt skew is deteriorated, and the speed of the skew of the belt may exceed the allowable value. As a result, the speed of the skew of the secondary transfer belt 102 exceeds acceptable limits, causing the guides at both ends of the secondary transfer belt 102 to strongly collide with the restricting member of the imbalance correction roller 45. This frequent contact can lead to premature wear and potentially damage the secondary transfer belt 102.

Figures 1, 5B:
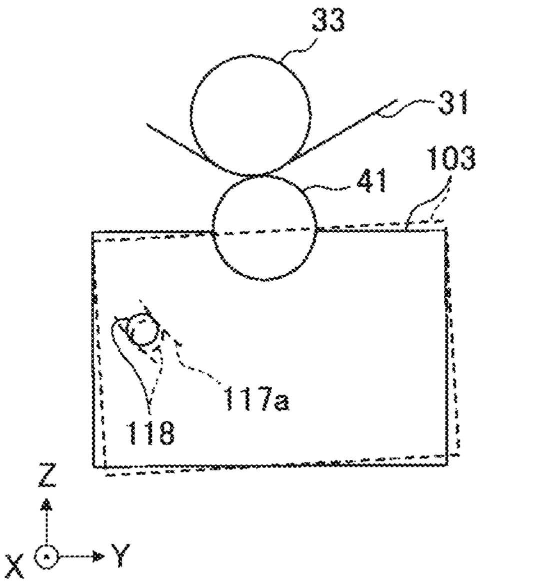
Figures 2, 5A:
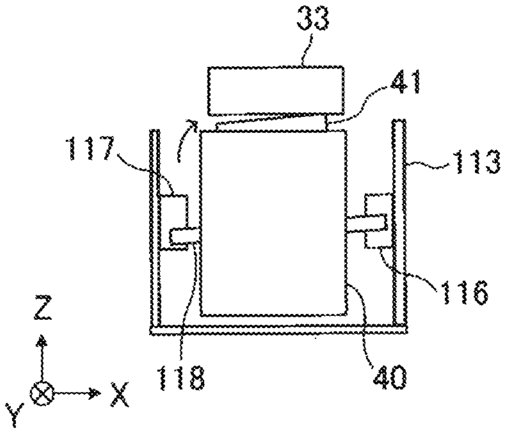
Figures 2, 5B:
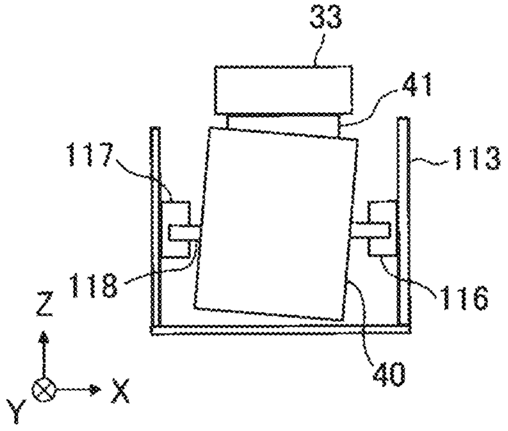

In contrast, in the present embodiment, the shaft 118 on the front side is supported so as to be swingable, and the shaft 118 on the rear side is supported so as to be movable concentrically with the rotation center of the secondary transfer roller 41. Thus, the secondary transfer unit 40 is supported by the drawer housing 113 without its orientation in the Y-direction being restricted. In this configuration, after the front portion of the secondary transfer roller 41 contacts the intermediate transfer belt 31, the orientation of the secondary transfer unit 40 around the Y-direction changes in such a manner that the entire rear portion of the secondary transfer unit 40 is lifted by the pressing force of the rotary arm 109 on the rear side as indicated by arrow Al in FIG. 5A-1. As a result, as illustrated in FIG. 5B-2, the secondary transfer unit 40 is inclined in the Z-direction with respect to the X-direction, and the entire region of the secondary transfer roller 41 in the X-direction is brought into contact with the intermediate transfer belt 31.

In this way, the secondary transfer unit 40 is only inclined in the Z-direction with respect to the X-direction, and the twist of the secondary transfer unit 40 is hardly changed from the natural state. Thus, the inclination of each roller can be maintained in an optimum relationship for reducing the belt skew, the worsening of the belt skew can be prevented, and the belt skew speed can be maintained at an allowable value or less.

FIGS. 6A-1, 6A-2, 6B-1, and 6B-2 are diagrams illustrating cases where a rear portion of the secondary transfer roller 41 is positioned higher than a front portion of the secondary transfer roller 41 when the secondary transfer unit 40 is twisted under normal conditions, according to the present embodiment.

Figures 1, 6A:
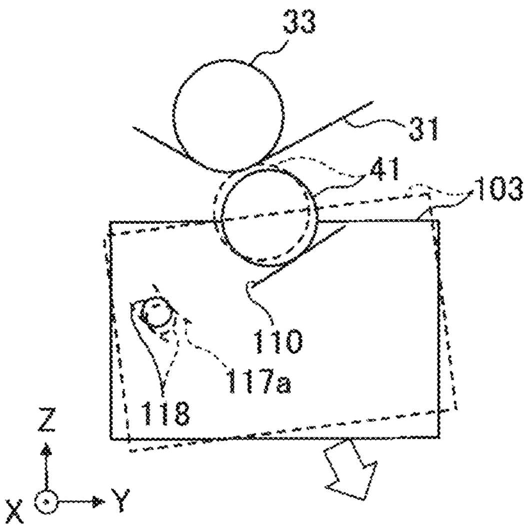

As illustrated in FIG. 6A-1 and FIG. 6A-2, when a rear portion of the secondary transfer roller 41 is positioned higher than a front portion of the secondary transfer roller 41 when the secondary transfer unit 40 is twisted under normal conditions, such a rear portion of the secondary transfer roller 41 indicated by broken lines in FIG. 6A-1 contacts the intermediate transfer belt 31 earlier than the front portion of the secondary transfer roller 41 indicated by a solid line in FIG. 6A-1.

Figures 1, 6B:
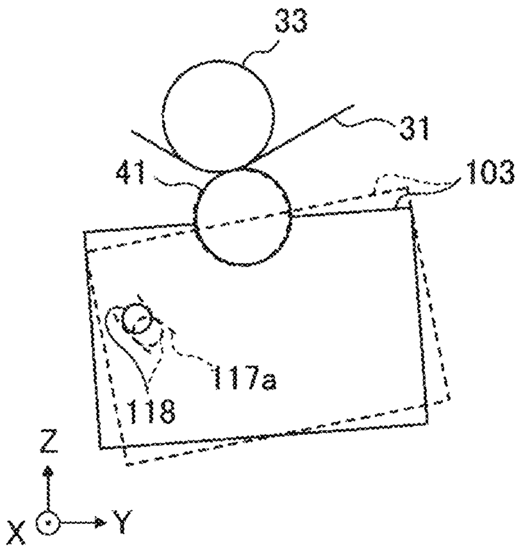
Figures 2, 6A:
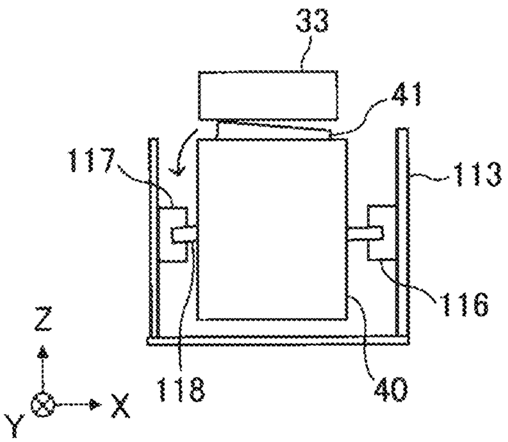
Figures 2, 6B:
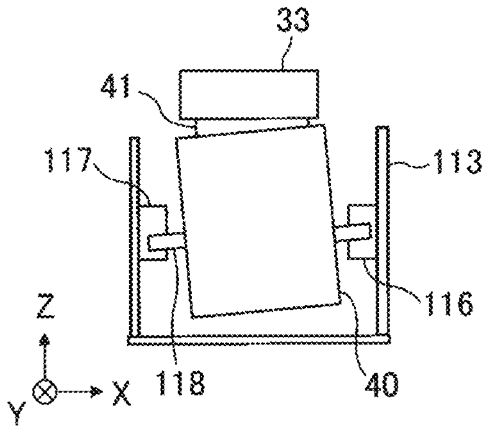

After the rear portion of the secondary transfer roller 41 contacts the intermediate transfer belt 31, when the rotation of the rotary arm 108 on the front side continues to cause the front portion of the secondary transfer roller 41 to contact the intermediate transfer belt 31, the front portion of the secondary transfer roller 41 rotates counterclockwise around the shaft 118 as a pivot point, as illustrated in FIG. 6A-1. At this time, the secondary transfer unit 40 is rotated counterclockwise as in FIG. 6A-2 by the reaction from the intermediate transfer belt 31 (or the secondary-transfer backside roller 33), that is, the secondary transfer unit 40 changes its orientation around the Y-direction. As a result, as illustrated in FIG. 6B-1 and FIG. 6B-2, when the front portion of the secondary transfer roller 41 contacts the intermediate transfer belt 31, the secondary transfer unit 40 is inclined with respect to the drawer housing 113 such that the rear portion of the secondary transfer unit 40 is positioned lower than the front portion of the secondary transfer unit 40.

As described above, even when the secondary transfer roller 41 is twisted such that the rear portion thereof is positioned higher than the front portion thereof, the orientation of the secondary transfer unit 40 around the Y-direction with respect to the drawer housing 113 is changed, and the entire secondary transfer roller 41 contacts the intermediate transfer belt 31. Thus, the inclination of each roller can be maintained in an optimum relationship for reducing the belt skew, the worsening of the belt skew can be prevented.

Further, as the groove 117*a* is formed in an arc shape around the rotation center of the secondary transfer roller 41 in the present embodiment, the positional displacement between the front portion and the rear portion of the secondary transfer roller 41 in the Y-axis direction when the secondary transfer roller 41 contacts the intermediate transfer belt 31 can be reduced. Accordingly, the changes in the pressure at the transfer nip can be reduced.

Figure 7:
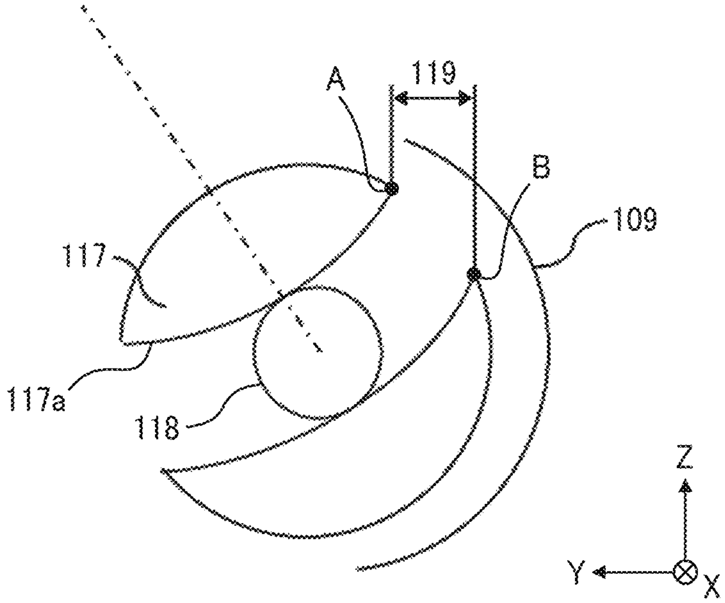
FIG. 7 is an enlarged view of a part of a rotary shaft on the rear side.

FIG. 7 is an enlarged view of a part of the rotary shaft 117 on the rear side as a second support.

As illustrated in FIG. 7, the groove 117*a* has a groove shape such that a shaft insertion port 119 that is an opening of the groove 117*a* into which the rear end portion of the shaft 118 is inserted when the secondary transfer unit 40 is assembled to the drawer housing 113 and is a reference-shaft insertion port, can be observed from above. Thus, the rear end portion of the shaft 118 can be inserted into the groove 117*a* merely by moving the secondary transfer unit 40 vertically downward, which is the assembly direction in which the secondary transfer unit 40 is assembled to the drawer housing 113. This facilitates the assembly of the secondary transfer unit 40 to the drawer housing 113. The groove of the second support has an arc shape having a center on an axial center of the second shaft and an opening at an entrance of the groove in the assembly.

Figure 8:
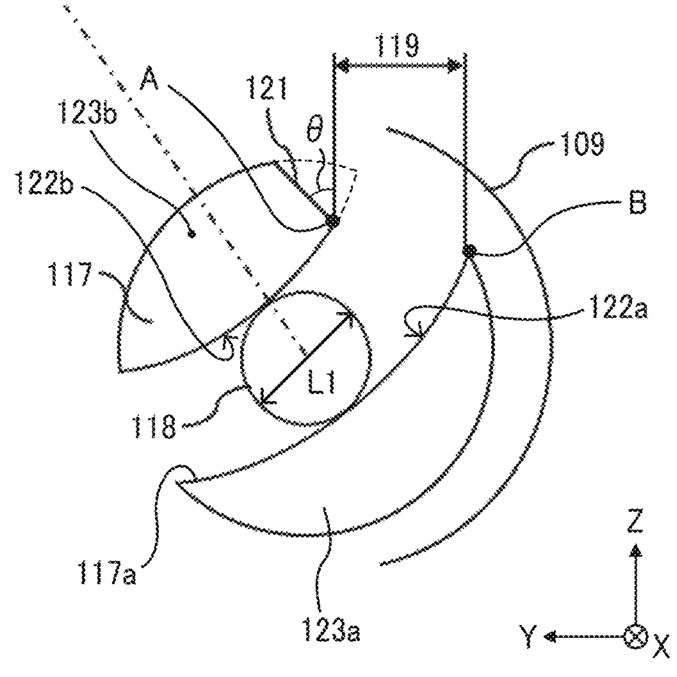
FIG. 8 is a diagram of a rotary shaft on the rear side according to a first modification of an embodiment of the present disclosure.

FIG. 8 is a diagram of a rotary shaft 117 on the rear side according to a first modification of an embodiment of the present disclosure.

In the present modification illustrated in FIG. 8, the rotary shaft 117 on the rear side includes an upper portion 123*b* that is placed upstream from the groove 117*a* of the rotary shaft 117 on the rear side in the assembly direction of the secondary transfer unit 40. The upper portion 123*b* has a guide face 121 that guides the rear end portion of the shaft 118. The guide face 121 is formed by cutting out an area of the upper portion 123*b* that is adjacent to the shaft insertion port 119, obliquely to the right with respect to the Z-direction in FIG. 8.

As illustrated in FIG. 8, by incorporating the guide face 121, when the rear end of the shaft 118 is offset to the left (or in the +Y-direction) during the assembly of the secondary transfer unit 40, the shaft 118 comes into contact with the guide face 121. Then, the shaft 118 is guided to the right (or in the −Y-direction) in FIG. 8 by the guide face 121, and moves to the shaft insertion port 119 of the groove 117*a*. Thus, the rear end portion of the shaft 118 can be inserted into the groove 117*a* through the shaft insertion port 119. This facilitates the assembly of the secondary transfer unit 40 to the drawer housing 113.

Further, as illustrated in FIG. 8, forming a notch to expose the lower surface 122*a* of the groove 117*a*, when viewed from above, provides the following advantages. In other words, when the shaft 118 guided by the guide face 121 reaches a joint A between the guide face 121 and the shaft insertion port 119, and contact with the guide face 121 is released, the rear end portion of the shaft 118 moves downward. When viewed from above, a notch is formed to expose the lower surface 122*a* of groove 117*a*. As a result, when the contact with guide face 121 is released and the rear end portion of shaft 118 moves downward, the shaft 118 comes into contact with the lower surface of groove 117*a*, allowing the shaft 118 to be inserted into the groove 117*a*.

The tilt angle θ of the guide face 121 relative to the Z-direction, which is the assembly direction, is preferably 45 degrees or less. By setting the tilt angle of the guide face 121 to 45 degrees or less, when the rear end portion of the shaft 118 comes into contact with the guide face 121, the shaft 118 can be smoothly moved along the guide face under the weight of the secondary transfer unit. This facilitates the insertion of the rear end portion of the shaft 118 into the groove 117*a*, making it easier to assembly the secondary transfer unit 40 into the drawer housing 113.

As illustrated in FIG. 8, the upper portion 123*b* of the rotary shaft 117 on the rear side is notched in an area adjacent to the shaft insertion port 119 (the right side in FIG. 8). This notch ensures that the length of the shaft insertion port 119 in the Y-direction is longer than the diameter L1 of the shaft 118. In this configuration, the length of the shaft insertion port 119 in the Y-direction is longer than the diameter L1 of the shaft 118. This configuration facilitates the insertion of the shaft 118 into the shaft insertion port 119 more than a configuration that the length of the shaft insertion port 119 is shorter than the diameter L1 of the shaft 118. This facilitates the assembly of the secondary transfer unit 40 to the drawer housing 113.

Figure 9A:
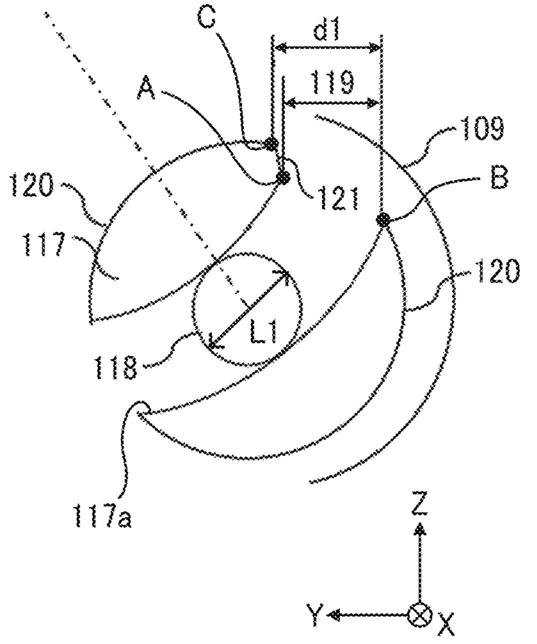
FIGS. 9A and 9B are diagrams each illustrating a rotary shaft on the rear side according to a second modification of an embodiment of the present disclosure.
Figure 9B:
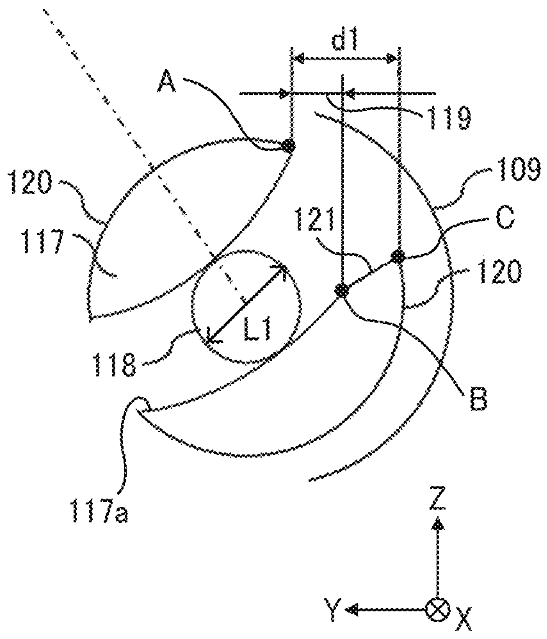

FIGS. 9A and 9B are diagrams each illustrating a rotary shaft 117 on the rear side according to a second modification of an embodiment of the present disclosure.

In the second modification as illustrated in FIGS. 9A and 9B, a length d1 between a joint C and a joint B in the Y-direction is made longer than the diameter L1 of the shaft 118. The joint C is between the guide face 121 and the outer circumferential surface 120, and the joint B is between the shaft insertion port 119 and the outer circumferential surface 120 of the rotary shaft 117 on the rear side.

In FIG. 9A, similarly to FIG. 8, the upper portion 123*b* has a notch in the area adjacent to the shaft insertion port 119. Further, the upper portion 123*b* has a guide face 121. In FIG. 9B, the lower portion 123*a* that is downstream from the groove 117*a* of the rotary shaft 117 on the rear side in the assembly direction has a notch in an area adjacent to the shaft insertion port. The lower portion 123*a* has a guide face 121. In FIGS. 9A and 9B, the length of the shaft insertion port 119 in the Y-direction is shorter than the diameter L1 of the shaft 118.

However, a length d1 between a joint C and a joint B (in FIG. 9A) or a joint A (in FIG. 9B) in the Y-direction is longer than the diameter L1 of the shaft 118. The joint Cis between the guide face 121 and the outer circumferential surface 120, and the joint B or A is between the shaft insertion port 119 and the outer circumferential surface 120 of the rotary shaft 117 on the rear side. Compared to a case where the length d1 in the Y-direction is shorter than the diameter L1 of the shaft 118, the configuration of FIGS. 9A and 9B makes it easier for the shaft 118 to contact the guide face 121 when the rear side of the shaft 118 shifts in the Y-direction during the assembly of the secondary transfer unit 40. This facilitates the insertion of the rear end portion of the shaft 118 into the groove 117*a*, making it easier to assembly the secondary transfer unit 40 into the drawer housing 113.

Additionally, incorporating the guide face 121 facilitates the insertion of the rear end portion of the shaft 118 into the groove 117*a* even when the length of the shaft insertion port 119 in the Y-direction is shorter than the diameter L1 of the shaft 118. In FIG. 9A, after being guided by the guide face 121, the shaft 118 comes into contact with the lower surface of the groove 117*a*, which is exposed from the shaft insertion port 119, when viewed from above. Subsequently, the shaft is guided downward to the left in the figure by this lower surface, allowing it to be inserted into the groove 117*a*.

However, in FIG. 9B, the rear end portion of the shaft 118 is guided downward to the left in the figure by the guide face 121, allowing it to be inserted into the groove 117*a*.

In the support unit, the second support includes a first portion upstream from the groove in the assembly direction; and a second portion downstream from the groove in the assembly direction. At least one of the first portion or the second portion has the guide face, and the second support has an entrance distance between a first upstream end of the guide face or the opening of the first portion and a second upstream end of the guide face or the opening of the second portion in the orthogonal direction, equal to or longer than a diameter of the first shaft.

The entrance distance is longer than a length of the shaft insertion port in the orthogonal direction.

Figure 10:
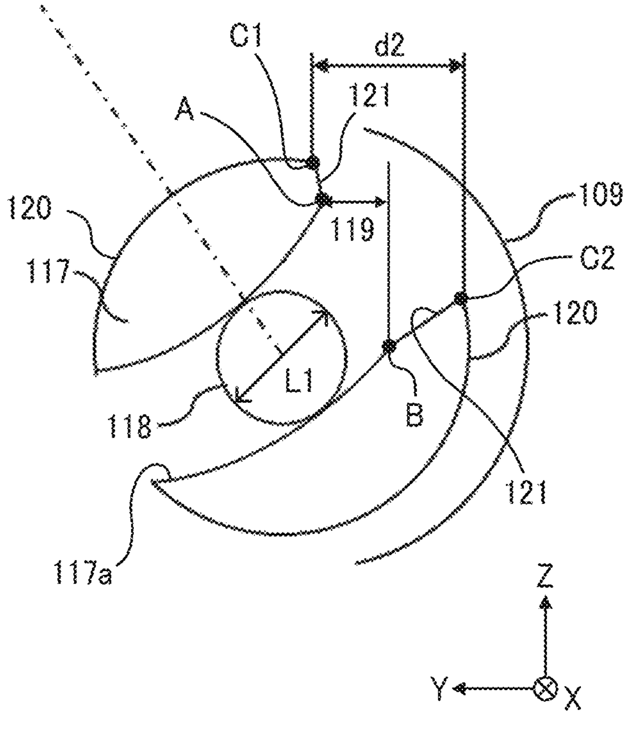
FIG. 10 is a diagram of a rotary shaft on the rear side according to a third modification of an embodiment of the present disclosure.

FIG. 10 is a diagram of a rotary shaft 117 on the rear side according to a third modification of an embodiment of the present disclosure.

In the third modification as illustrated in FIG. 10, each of the upper portion 123*b* and the lower portion 123*a* of the rotary shaft 117 has a guide face 121.

By incorporating the guide faces 121 on both the upper portion 123*b* and the lower portion 123*a*, the rear end portion of the shaft 118 can be guided by the guide face 121 regardless of whether it shifts to the left (or in the +Y-direction) or to the right (or in the −Y-direction) during the assembly of the secondary transfer unit 40. This facilitates the insertion of the shaft 118 into the groove 117*a*.

In the third modification as illustrated in FIG. 10, a length d2 in the Y-direction between a joint C1 and a joint C2 is preferably equal to or longer than the diameter L1 of the shaft 118. The joint C1 is between the guide face of the upper portion 123*b* of the rotary shaft 117 and the outer circumferential surface of the rotary shaft 117. The joint C2 is between the guide face of the lower portion 123*a* of the rotary shaft 117 and the outer circumferential surface of the rotary shaft 117. Compared to a case where the length d2 in the Y-direction is shorter than the diameter L1 of the shaft 118, the configuration of FIG. 10 makes it easier for the shaft 118 to contact the guide face 121 when the rear side of the shaft 118 shifts in the Y-direction during the assembly of the secondary transfer unit 40. This facilitates the insertion of the rear end portion of the shaft 118 into the groove 117*a*, making it easier to assembly the secondary transfer unit 40 into the drawer housing 113.

Figure 11A:
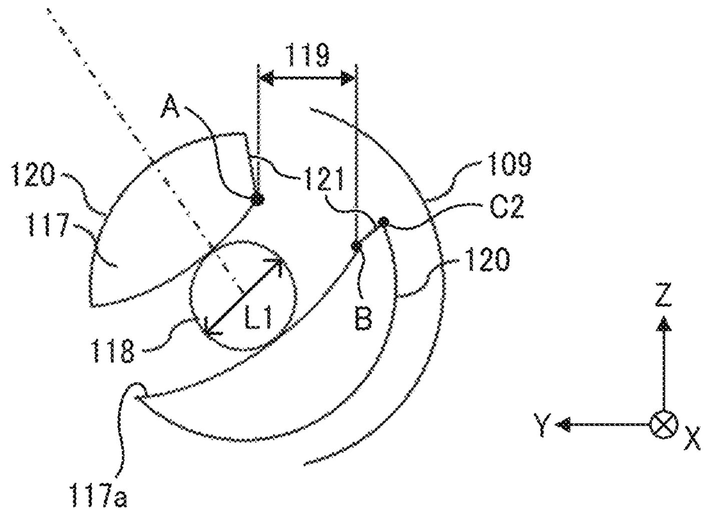
FIGS. 11A, 11B, and 11C are diagrams each illustrating a configuration of the rotary shaft on the rear side according to the third modification.
Figure 11B:
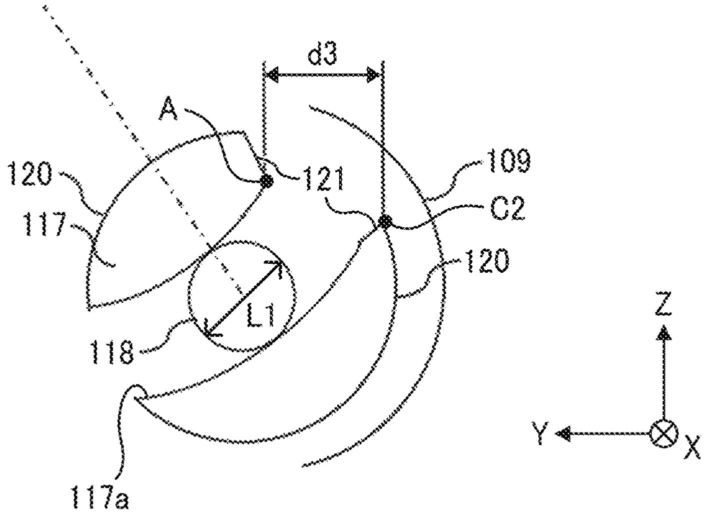
Figure 11C:
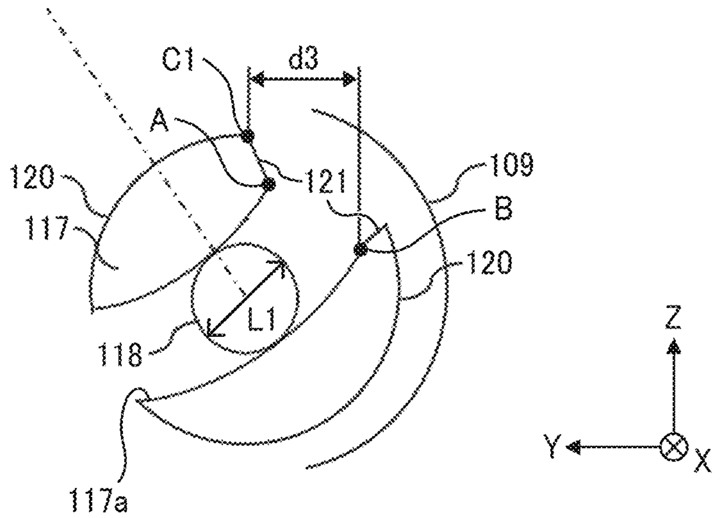

In the third modification, as illustrated in FIG. 11A, the length of the shaft insertion port 119 in the Y-direction is preferably longer than the diameter L1 of the shaft 118. As illustrated in FIGS. 11B and 11C, a length d3 between a joint C2 (in FIG. 11B) or a joint C1 (in FIG. 11C) and a joint A (in FIG. 11B) or a joint B (in FIG. 11C) in the Y-direction is longer than the diameter L1 of the shaft 118. The joint C2 (in FIG. 11B) or C1 (in FIG. 11C) is between the guide face 121 and the outer circumferential surface 120, and the joint A (in FIG. 11B) or B (in FIG. 11C) is between the shaft insertion port 119 and the outer circumferential surface 120 of the rotary shaft 117 on the rear side. In the third modification as illustrated in FIGS. 11A to 11C, the rear end portion of the shaft 118 can be inserted into the groove 117*a* more easily than the configuration of FIG. 10.

In the support unit, the second support includes: a first portion upstream from the groove in the assembly direction; a second portion downstream from the groove in the assembly direction; and multiple guide faces including the guide face. The multiple guide faces includes: a first guide face on a first upstream end of the first portion; and a second guide face on a second upstream end of the second portion. The second support has an entrance distance between the first upstream end of the first portion and the second upstream end of the second portion, equal to or longer than a diameter of the first shaft in the orthogonal direction.

The entrance distance between the first upstream end and the second upstream end of the second portion is longer than a length of the shaft insertion port in the orthogonal direction.

Figure 12:
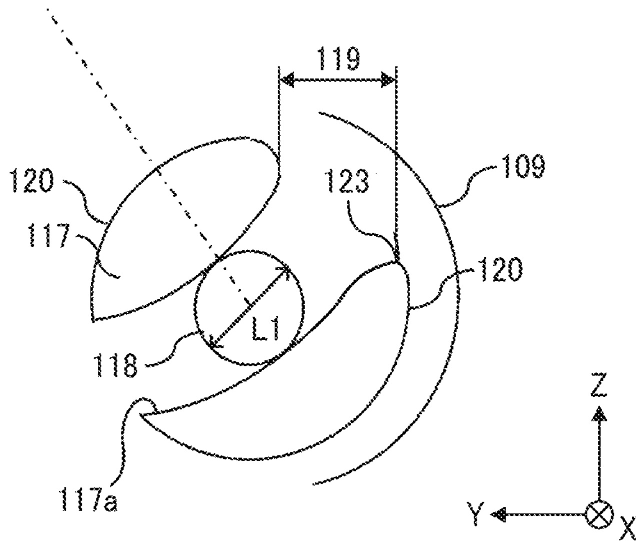
FIG. 12 is a diagram of a rotary shaft on the rear side according to a fourth modification of an embodiment of the present disclosure.

FIG. 12 is a diagram of a rotary shaft 117 on the rear side according to a fourth modification of an embodiment of the present disclosure.

In the fourth modification as illustrated in FIG. 12, the width of the groove gradually increases in a direction toward the shaft insertion port 119. Additionally, the length of the shaft insertion port 119 in the Y-direction is equal to or longer than the diameter L1 of the shaft 118. With this configuration, the insertion of the shaft 118 into the shaft insertion port 119 from above is facilitated compared to cases where the length of the shaft insertion port 119 in the Y-direction is less than the diameter L1 of the shaft 118. Thus, the shaft 118 can be easily inserted into the groove 117*a* through the shaft insertion port 119 during the assembly of the second transfer unit to the drawer housing.

As described with reference to FIGS. 4A-1 to 6B-2, when the secondary transfer roller 41 is pressed against the intermediate transfer belt 31 and the secondary transfer unit rotates around the Y-axis, a portion of the groove outside the intended movement range of the shaft 118 gradually expands. For example, by reducing the radius of curvature on at least one of the lower surface and the upper surface of the groove outside the intended movement range compared to within that movement range, the width of the groove outside this range can be gradually increased.

As illustrated in FIGS. 8 to 11 in which the rotary shaft 117 on the rear side is notched to provide one or more guide faces 121, the joint between the guide face 121 and the shaft insertion port 119 is angled. The angular shape of the joint may cause the shaft 118 to get snagged and potentially damage it during attachment or detachment from the groove 117*a*. As illustrated in FIG. 12, the configuration lacks any angular portions, which prevents damage to the shaft 118 during attachment or detachment from the groove 117*a*.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

In the description above, the present embodiment is applied to a drawer-type support unit that holds the secondary transfer unit as the pressure unit. However, the present embodiment can also be applied to other support units, such as those supporting the pressure rollers in fixing devices, for example.

The configurations according to the above-descried embodiments are examples, and embodiments of the present disclosure are not limited to the above. For example, the following aspects can achieve effects described below.

Aspect 1

A support unit includes a first support (e.g., the rotary shaft 116 on the front side) to support and position one end of a first shaft (or the reference shaft 118) of a first shaft of a pressure unit (e.g., the secondary transfer unit 40) including a pressure rotator (e.g., the secondary transfer roller 41) to apply pressure to an object (e.g., the intermediate transfer belt 31), in each of: an assembly direction (e.g., the Z-direction) in which the pressure unit is assembled to the support unit; and an orthogonal direction (e.g., the Y-direction) orthogonal to each of the assembly direction and an axial direction (e.g., the X-direction) of the pressure unit; a second support (e.g., the rotary shaft 117 on the rear side) having a groove (e.g., the groove 117*a*) to support another end of the first shaft; and a third support (e.g., the contact surfaces 110 and 111) supporting a second shaft (e.g., the secondary transfer roller shaft 106) of the pressure rotator. The first support, the second support, and the third support the pressure unit to be rotatable around the reference shaft. The groove has a shape of an arc having a center on an axial center of the second shaft; and an opening as viewed in the assembly direction.

Due to manufacturing errors, when the pressure rotator contacts the pressed member (or a pressurized object), the distance between one side of the pressure rotator and the pressurized object may differ from the distance between its opposite side and the pressurized object along the axis. When positioning the pressure unit, if both ends of the reference shaft are aligned both with the direction of assembly into the support unit and perpendicular to both the assembly direction and the axis direction, the pressure unit may become twisted.

Specifically, after the closer side of the pressure member or the pressure rotator contacts the pressurized object, the pressure unit may twist. This twisting action accommodates the difference in distance between one end (one side) of the pressure rotator and the another end (its opposite side) relative to the pressurized object. Eventually, this allows the side of the pressure rotator that was initially further away to also make contact with the pressurized object. Thus, if twisting occurs in the pressure unit, it could disrupt the positional relationships between components installed within the pressure unit.

In contrast, in Aspect 1, the another end of the reference shaft is supported by the groove portion of the second support portion so as to be movable in an arc shape around the axial center of the shaft of the pressure member. As a result, after the end (closer side) of the pressure rotator that is closer to the pressurized object than the another end along the axial direction contacts the pressurized object, the another end (distal side) is brought into contact with the pressurized object. As the another end of the reference shaft moves within a groove, the pressure unit tilts with respect to the axial direction when viewed in the orthogonal direction. This compensates for any differences in distance between the two ends of the pressure rotator due to manufacturing errors or other factors, enabling the distal side of the pressure rotator to contact the pressurized object.

By tilting the pressure unit, it can absorb the differences in distance between the ends of the pressure rotator and the pressurized object. This helps to prevent twisting in the pressure unit when the pressure rotator applies pressure to the pressurized object.

In Aspect 1, the groove is shaped such that its opening is visible when viewed in the direction of assembly. This allows the another end of the reference shaft to be easily inserted into the groove by simply moving the pressure unit in the direction of assembly toward the support unit. Thus, the assembly of the pressure unit to the support unit is facilitated.

Aspect 2

In the aspect 1, when viewed in the axial direction (e.g., the X-direction), the opening (e.g., the shaft insertion port 119) has a length from one end to the another end in the orthogonal direction (e.g., Y-direction) is longer than a diameter of the reference shaft (e.g., the shaft 118).

This configuration allows the reference shaft such as the shaft 118 to be easily inserted into the opening such as the shaft insertion port 119 in the assembly direction (Z-direction) and also facilitates the assembly of the pressure unit such as the secondary transfer unit 40 to the support unit such as the drawer housing 113.

Aspect 3

In the aspect 2, the second support (e.g., the rotary shaft 117 on the rear side) includes: a first portion (e.g., the upper portion 123*b*) upstream from the groove (e.g., the groove 117*a*) in the assembly direction; and a second portion (e.g., the lower portion 123*a*) downstream from the groove in the assembly direction. At least one of the first portion or the second portion has a notch adjacent to the opening.

With this configuration, as described in the above embodiment, the length between one end and the another end of the opening (e.g., the shaft insertion port 119) in the orthogonal direction (e.g., the Y-direction) as viewed in the axial direction (e.g., the X-direction) can be made longer than the diameter of the reference shaft such as the shaft 118.

Aspect 4

In Aspect 2, a width of the groove (e.g., the groove 117*a*) gradually increases toward the opening (e.g., the shaft insertion port 119).

With this configuration, as described with reference to FIG. 12 above, the length between one end and the another end of the opening (e.g., the shaft insertion port 119) of the groove in the orthogonal direction (e.g., the Y-direction) as viewed in the axial direction (e.g., the X-direction) can be made longer than the diameter of the reference shaft such as the shaft 118.

Compared to a case where the length of the reference-shaft insertion port (e.g., the shaft insertion port 119) from one end to the another end in the orthogonal direction (e.g., the Y-direction) is longer than the diameter of the reference shaft (e.g., the shaft 118) when viewed in the axial direction (e.g., the X-direction), the notch prevents the shaft 118 from getting snagged and prevents damage to the shaft 118 during attachment or detachment from the groove 117*a*.

Aspect 5

In any one of Aspects 1 to 4, the opening includes a reference-shaft insertion port through which the another end of the reference shaft is inserted into the groove (e.g., the groove 117*a*). The second support (e.g., the rotary shaft 117 on the rear side) has a guide face 121 tilted relative to the assembly direction (or the groove) to guide the another end of the reference shaft (e.g., the shaft 118) to the reference-shaft insertion port (e.g., the shaft insertion port 119).

With this configuration, as described in the above embodiment, when the reference shaft is offset from the reference-shaft insertion port (e.g., the shaft insertion port 119) in the vertical direction (e.g., the Y-direction) and contacts the guide face 121, the reference shaft (e.g., the shaft 118) of the secondary transfer unit 40 is guided by the guide face 121 into the reference-shaft insertion port. Thus, the reference shaft can be easily inserted into the reference-shaft insertion port, and the pressure unit (e.g., the secondary transfer unit 40) can be easily assembled to the support unit (e.g., the drawer housing 113).

Aspect 6

A support unit includes a first support (e.g., the rotary shaft 116 on the front side) to support and restrict one end of a first shaft (or the reference shaft 118) in each of: an assembly direction (e.g., the Z-direction) in which the pressure unit is assembled to the support unit; and an orthogonal direction (e.g., the Y-direction) perpendicular to each of the assembly direction and an axial direction (e.g., the X-direction) of the pressure unit, the first shaft to position a pressure unit (e.g., the secondary transfer unit 40) including a pressure rotator (e.g., the secondary transfer roller 41) to pressurize a pressurized object (e.g., the intermediate transfer belt 31); a second support (e.g., the rotary shaft 117 on the rear side); and a third support (e.g., the contact surfaces 110 and 111) supporting a second shaft (e.g., the secondary transfer roller shaft 106) of the pressure rotator. The second support has a groove (e.g., the groove 117*a*) to support the another end of the first shaft; a shaft insertion port (e.g., the shaft insertion port 119) through which the another end of the first shaft is inserted into the groove (e.g., the groove 117*a*); and a guide face (e.g., the guide face 121) tilted relative to the assembly direction to guide the another end of the first shaft to the shaft insertion port. The first support, the second support, and the third support supports the pressure unit to be rotatable around the reference shaft. The groove has a shape of an arc centered on a center of the second shaft (e.g., the shaft of the pressure rotator).

Similarly to Aspect 1, the another end of the reference shaft is supported by the groove of the second support so as to be movable in an arc shape around the center of the shaft of the pressure rotator such as the secondary transfer roller 41.

As a result, after the end (closer side) of the pressure rotator that is closer to the pressurized object than the another end along the axial direction contacts the pressurized object, the another end (distal side) is brought into contact with the pressurized object. As the another end of the reference shaft moves within a groove, the pressure unit tilts with respect to the axial direction when viewed in the orthogonal direction (e.g., the Y-direction). As it tilts, the another end (the distal end) of the pressure rotator that is away from the pressure unit approaches the pressurized object (e.g., the intermediate transfer belt 31), allowing this end (the distal end) of the pressure rotator to make contact with the pressurized object. Thus, the pressure unit may twist when the pressing member applies pressure to the pressurized object.

With this configuration, as described in the above embodiment, when the reference shaft is offset from the reference-shaft insertion port (e.g., the shaft insertion port 119) in the vertical direction (e.g., the Y-direction) and contacts the guide face 121, the reference shaft (e.g., the shaft 118) of the secondary transfer unit 40 is guided by the guide face 121 into the reference-shaft insertion port. Thus, the reference shaft can be easily inserted into the reference-shaft insertion port, and the pressure unit (e.g., the secondary transfer unit 40) can be easily assembled to the support unit (e.g., the drawer housing 113).

Aspect 7

In Aspect 5 or 6, the second support (e.g., the rotary shaft 117 on the rear side) includes: a first portion (e.g., the upper portion 123*b*) upstream from the groove (e.g., the groove 117*a*) in the assembly direction; and a second portion (e.g., a portion 123*a*) downstream from the groove in the assembly direction. At least one of the first portion or the second portion has the guide face (e.g., the guide face 121). In a plane orthogonal to the axial direction or when viewed in the axial direction, a distance (e.g., the length d1) between a first point (e.g., a joint A) and a second point in the orthogonal direction is equal to or longer than a diameter L1 of the first shaft (e.g., the reference shaft). The first point is a joint between the guide face and an outer circumferential surface 120 of one of the first portion and the second portion, and the second point is an edge of the shaft insertion port (e.g., the shaft insertion port 119) that is adjacent to the another one of the first portion and the second portion.

According to this configuration, as described with reference to FIG. 9, the reference shaft (e.g., the shaft 118) is more likely to contact the guide face 121 when the another end of the reference shaft shifts in the orthogonal direction (e.g., the Y-direction) during the assembly of the pressure unit (e.g., the secondary transfer unit 40), compared to the case where the length d1 is less than the diameter L1 of the reference shaft. Thus, the reference shaft can be further easily inserted into the reference-shaft insertion port, and the pressure unit (e.g., the secondary transfer unit 40) can be easily assembled to the support unit (e.g., the drawer housing 113).

Aspect 8

In Aspect 7, in the plane perpendicular to the axial direction (or when viewed in the axial direction (e.g., in the Y-direction), the distance between the first point (e.g., the joint A) and the second point in the orthogonal direction is longer than a length of the shaft insertion port (e.g., the shaft insertion port 119) in the orthogonal direction. The first point is a joint (e.g., the joint A) between the guide face (e.g., the guide face 121) and an outer circumferential surface 120 of one of the first portion (e.g., the upper portion 123*b* upstream from the groove in the assembly direction) and the second portion (e.g., the lower portion 123*a* downstream from the groove in the assembly direction), and the second point is an edge of the shaft insertion port (e.g., the shaft insertion port 119) that is adjacent to the another one of the first portion and the second portion.

With this configuration, even when the length of the reference-shaft insertion opening in the orthogonal direction is shorter than the diameter of the reference shaft, the reference shaft can be guided by the guide face and the reference shaft can be easily inserted into the reference-shaft insertion opening.

Aspect 9

In Aspect 5 or 6, the support unit further includes multiple guide faces (e.g., the guide faces 121) including the guide face (e.g., the guide face 121). The second support (e.g., the rotary shaft 117 on the rear side) includes: a first portion (e.g., the upper portion 123*b*) upstream from the groove (e.g., the groove 117*a*) in the assembly direction (e.g., the Z-direction) and having a first guide face (e.g., the guide face 121) of the multiple guide faces; and a second portion (e.g., the lower portion 123*a*) downstream from the groove in the assembly direction and having a second guide face (e.g., the guide face 121) of the multiple guide faces. In a plane orthogonal to the axial direction (when viewed in the axial direction, e.g., the Z-direction), a distance (the length d2) between a first joint (e.g., the joint C1) and a second joint (the joint C2) in the orthogonal direction is equal to or longer than a diameter (e.g., the diameter L1) of the first shaft (e.g., the reference shaft, the shaft 118) where the first joint is between the first guide face and a first outer circumferential surface 120 of the first portion, and the second joint is between the second guide face and a second outer circumferential surface 120 of the second portion.

According to this configuration, as described with reference to FIG. 10, the reference shaft (e.g., the shaft 118) is more likely to contact the guide face 121 when the another end of the reference shaft shifts in the orthogonal direction (e.g., the Y-direction) during the assembly of the pressure unit (e.g., the secondary transfer unit 40), compared to the case where the length d1 is less than the diameter L1 of the reference shaft. Thus, the reference shaft can be further easily inserted into the reference-shaft insertion port, and the pressure unit (e.g., the secondary transfer unit 40) can be easily assembled to the support unit (e.g., the drawer housing 113).

Aspect 10

In the aspect 9, in the plane orthogonal to the axial direction (when viewed in the axial direction, e.g., the Y-direction), the distance between the first joint (e.g., the joint C1) and the second joint (e.g., the joint C2) in the orthogonal direction (e.g., in the Y-direction) is longer than a length of the shaft insertion port in the orthogonal direction.

With this configuration, even when the length of the reference-shaft insertion opening in the orthogonal direction is shorter than the diameter of the reference shaft, the reference shaft can be guided by the guide face and the reference shaft can be easily inserted into the reference-shaft insertion opening.

Aspect 11

In any one of Aspects 5 to 10, a tilt angle of the guide face (e.g., the guide face 121) relative to the assembly direction (e.g., the Z-direction) is 45 degrees or less.

With this configuration, as described in the above embodiment, when the pressure unit (e.g., the secondary transfer unit 40) is assembled to the support unit (e.g., the drawer housing 113), the reference shaft can be moved relative to the guide face by a weak force in the assembly direction. Thus, the reference shaft can be easily inserted into the reference-shaft insertion port.

Aspect 12

In any one of Aspects 1 to 11, the support unit further includes a pressing body (e.g., the rotary arms 108 and 109) including the third support (e.g., the contact surfaces 110 and 111) that supports the second shaft (e.g., the secondary transfer roller shaft 106) of the pressure rotator, to press the pressure rotator against the pressurized object.

According to this configuration, the third support presses the shaft (e.g., the secondary transfer roller shaft 106) of the pressure rotator (e.g., the secondary transfer roller 41) so as to press the pressure rotator (e.g., the secondary transfer roller 41) against the pressurized object (e.g., the intermediate transfer belt).

Aspect 13

A transfer device includes multiple tension rollers including a transfer roller (e.g., the secondary transfer roller 41) as the pressure rotator; and a transfer belt (e.g., the secondary transfer belt 102) looped around the multiple tension rollers; a pressure unit (e.g., the secondary transfer unit 40) to press the transfer roller against the pressurized object including an image carrier (e.g., the intermediate transfer belt 31) via the transfer belt to form a transfer nip; and the support unit (e.g., the drawer housing 113) according to any one of Aspects 1 to 12 supporting the pressure unit.

With this configuration, the occurrence of twisting in the pressure unit (e.g., the secondary transfer unit) is reduced, and the pressure unit can be easily assembled to the support unit (e.g., the drawer housing 113).

Aspect 14

In an image forming apparatus including a transfer device, the transfer device according to Aspect 13 is used as the transfer device.

With this configuration, the occurrence of twisting in the pressure unit (e.g., the secondary transfer unit) is reduced, and the pressure unit can be easily assembled to the support unit (e.g., the drawer housing 113).

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A support unit comprising:

a first support to support and position one end of a first shaft of a pressure unit, including a pressure rotator to apply pressure to an object, in each of:

an assembly direction in which the pressure unit is assembled to the support unit; and an orthogonal direction orthogonal to each of the assembly direction and an axial direction of the first shaft;

a second support having a groove supporting another end of the first shaft; and a third support supporting a second shaft of the pressure rotator, wherein the first support, the second support, and the third support the pressure unit rotatable around the first shaft, and the groove of the second support has:

an arc shape having a center on an axial center of the second shaft; and an opening at an entrance of the groove in the assembly direction.

2. The support unit according to claim 1, wherein the opening has a length longer than a diameter of the first shaft in the orthogonal direction.

3. The support unit according to claim 2, wherein the second support includes:

a first portion upstream from the groove in the assembly direction; and a second portion downstream from the groove in the assembly direction, and at least one of the first portion or the second portion has a notch adjacent to the opening.

4. The support unit according to claim 2, wherein a width of the groove gradually increases toward the opening in the assembly direction.

5. The support unit according to claim 1, wherein the opening includes a shaft insertion port through which the another end of the first shaft is inserted into the groove, and the second support has a guide face tilted relative to the groove to guide the another end of the first shaft to the shaft insertion port.

6. The support unit according to claim 5, wherein the second support includes:

a first portion upstream from the groove in the assembly direction; and a second portion downstream from the groove in the assembly direction, at least one of the first portion or the second portion has the guide face, and the second support has an entrance distance, between a first upstream end of the guide face or the opening of the first portion and a second upstream end of the guide face or the opening of the second portion in the orthogonal direction, equal to or longer than a diameter of the first shaft.

7. The support unit according to claim 6, wherein the entrance distance is longer than a length of the shaft insertion port in the orthogonal direction.

8. The support unit according to claim 5, wherein the second support includes:

a first portion upstream from the groove in the assembly direction;

a second portion downstream from the groove in the assembly direction; and multiple guide faces including the guide face including:

a first guide face on a first upstream end of the first portion; and a second guide face on a second upstream end of the second portion, and the second support has an entrance distance, between the first upstream end of the first portion and the second upstream end of the second portion, equal to or longer than a diameter of the first shaft in the orthogonal direction.

9. The support unit according to claim 8, wherein the entrance distance between the first upstream end of the first portion and the second upstream end of the second portion is longer than a length of the shaft insertion port in the orthogonal direction.

10. The support unit according to claim 5, wherein a tilt angle of the guide face relative to the assembly direction is 45 degrees or less.

11. The support unit according to claim 1, further comprising a pressing body including the third support, to press the pressure rotator against the object.

12. A transfer device comprising:

multiple tension rollers including a transfer roller; and a transfer belt looped around the multiple tension rollers;

a pressure unit to press the transfer roller against an image carrier via the transfer belt to form a transfer nip; and the support unit according to claim 1 supporting the pressure unit.

13. An image forming apparatus comprising the transfer device according to claim 12.

14. A support unit comprising:

a first support to support and position one end of a first shaft of a pressure unit, including a pressure rotator to apply pressure to an object, in each of:

an assembly direction in which the pressure unit is assembled to the support unit; and an orthogonal direction orthogonal to each of the assembly direction and an axial direction of the first shaft;

a second support having:

a groove supporting another end of the first shaft;

a shaft insertion port through which the another end of the first shaft is inserted into the groove; and a guide face tilted relative to the groove to guide the another end of the first shaft to the shaft insertion port; and a third support supporting a second shaft of the pressure rotator, wherein the first support, the second support, and the third support the pressure unit rotatable around the first shaft, and the groove of the second support has an arc shape having a center on an axial center of the second shaft.

* * * * *